(12) United States Patent
Nishimura

(10) Patent No.: US 11,422,998 B2
(45) Date of Patent: Aug. 23, 2022

(54) DATA MANAGEMENT SYSTEM, DATA MANAGEMENT DEVICE, DATA MANAGEMENT METHOD, AND STORAGE MEDIUM

(71) Applicant: NEC Corporation, Tokyo (JP)

(72) Inventor: Shoji Nishimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 746 days.

(21) Appl. No.: 15/509,233

(22) PCT Filed: Sep. 3, 2015

(86) PCT No.: PCT/JP2015/004478
§ 371 (c)(1),
(2) Date: Mar. 7, 2017

(87) PCT Pub. No.: WO2016/038858
PCT Pub. Date: Mar. 17, 2016

(65) Prior Publication Data
US 2017/0262482 A1    Sep. 14, 2017

(30) Foreign Application Priority Data

Sep. 9, 2014   (JP) .............................. JP2014-182816

(51) Int. Cl.
*G06F 16/22*   (2019.01)
*G06F 16/51*   (2019.01)
(Continued)

(52) U.S. Cl.
CPC .......... *G06F 16/2246* (2019.01); *G06F 16/00* (2019.01); *G06F 16/2272* (2019.01); *G06F 16/51* (2019.01); *G06F 16/71* (2019.01)

(58) Field of Classification Search
CPC .. G06F 16/2246; G06F 16/2272; G06F 16/51; G06F 16/00; G06F 16/71;
(Continued)

(56) References Cited

U.S. PATENT DOCUMENTS 5,606,669 A *  2/1997 Bertin ..................... H04L 45/00
                                                709/224
9,558,297 B1 *  1/2017 Bailey ................... G06F 12/023
(Continued)

FOREIGN PATENT DOCUMENTS

| JP | 58-3032 A | 1/1983 |
| JP | 10-63671 A | 3/1998 |
| JP | 2014-126881 A | 7/2014 |

OTHER PUBLICATIONS

Jianquan Liu et al.; "Efficient Similarity Searches Using a Tree Structure Index Based on Similarity Hierarchical Relations"; Mar. 3-5, 2013; The 5th Forum on Data Engineering and Information Management.

(Continued)

*Primary Examiner* — Alford W Kindred
*Assistant Examiner* — Cecile H Vo
(74) *Attorney, Agent, or Firm* — Sughrue Mion, PLLC

(57) ABSTRACT

A data management system includes: a tree-structure-holding means for storing a transformed tree structure into which an original tree structure has been transformed by a rotation operation, the original tree structure being a tree structure indicating hierarchical inclusion relations among data sets associated with nodes; an inter-data-relation-holding means for storing a reverse link, the reverse link being a link
(Continued)

between nodes the levels of which have been reversed by the rotation operation; and an inter-link-relation-holding means for storing a temporarily placed link in association with the reverse link, the temporarily placed link being a link to a node that has been transferred from immediately below an ex-lower-level node to immediately below an ex-upper-level node, the ex-lower-level node and the ex-upper-level node being nodes the levels of which have been reversed.

14 Claims, 11 Drawing Sheets

(51) Int. Cl.
*G06F 16/71* (2019.01)
*G06F 16/00* (2019.01)

(58) Field of Classification Search
CPC .. G06F 16/9027; G06F 16/322; G06F 16/185; G60F 16/71
USPC ......... 707/E17.032, E17.044, 791, 802, 828, 707/769, E17.012, 797
See application file for complete search history.

(56) References Cited

U.S. PATENT DOCUMENTS

| | | | |
|---|---|---|---|
| 2010/0250611 A1* | 9/2010 | Krishnamurthy | G06F 16/904 707/E17.05 |
| 2013/0262470 A1* | 10/2013 | Kusumura | G06F 16/319 707/742 |
| 2015/0169657 A1* | 6/2015 | Pal | G06F 16/9027 707/797 |
| 2016/0070767 A1* | 3/2016 | Karras | G06T 15/80 707/602 |
| 2016/0224565 A1* | 8/2016 | Hardas | G06F 16/24578 |
| 2017/0262482 A1* | 9/2017 | Nishimura | G06F 16/51 |

OTHER PUBLICATIONS

International Search Report for application No. PCT/JP2015/004478 dated Dec. 8, 2015.
Written Opinion for application No. PCT/JP2015/004478 dated Dec. 8, 2015.

* cited by examiner

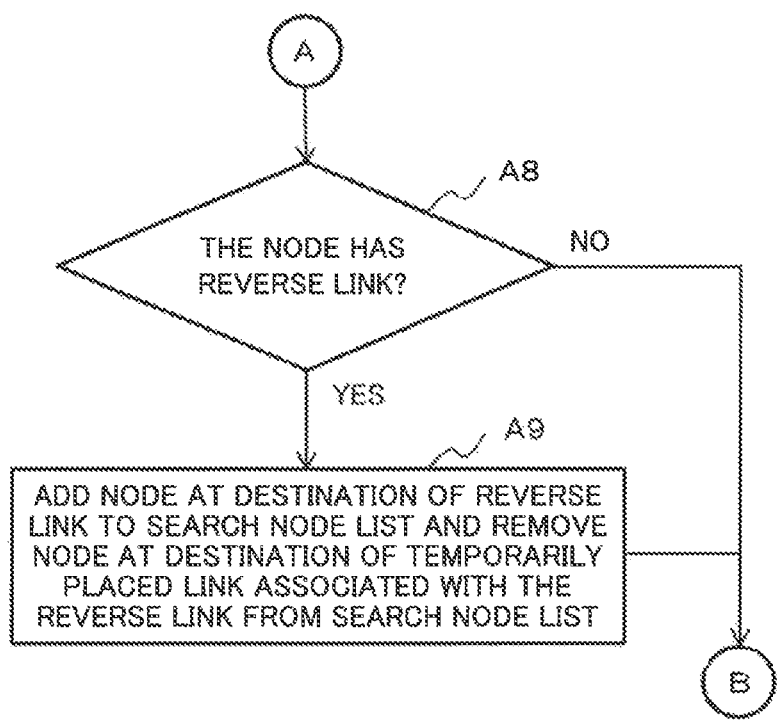

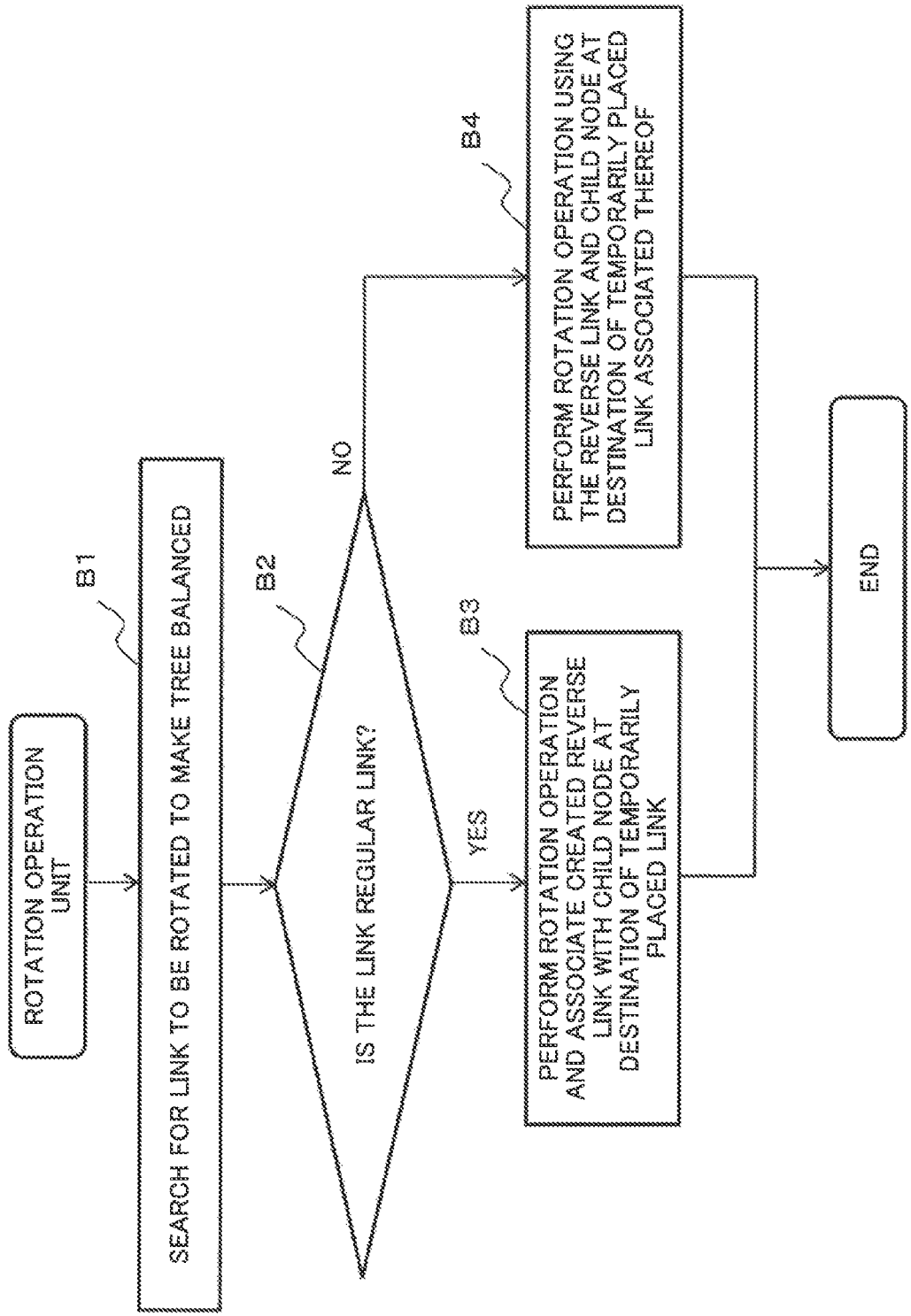

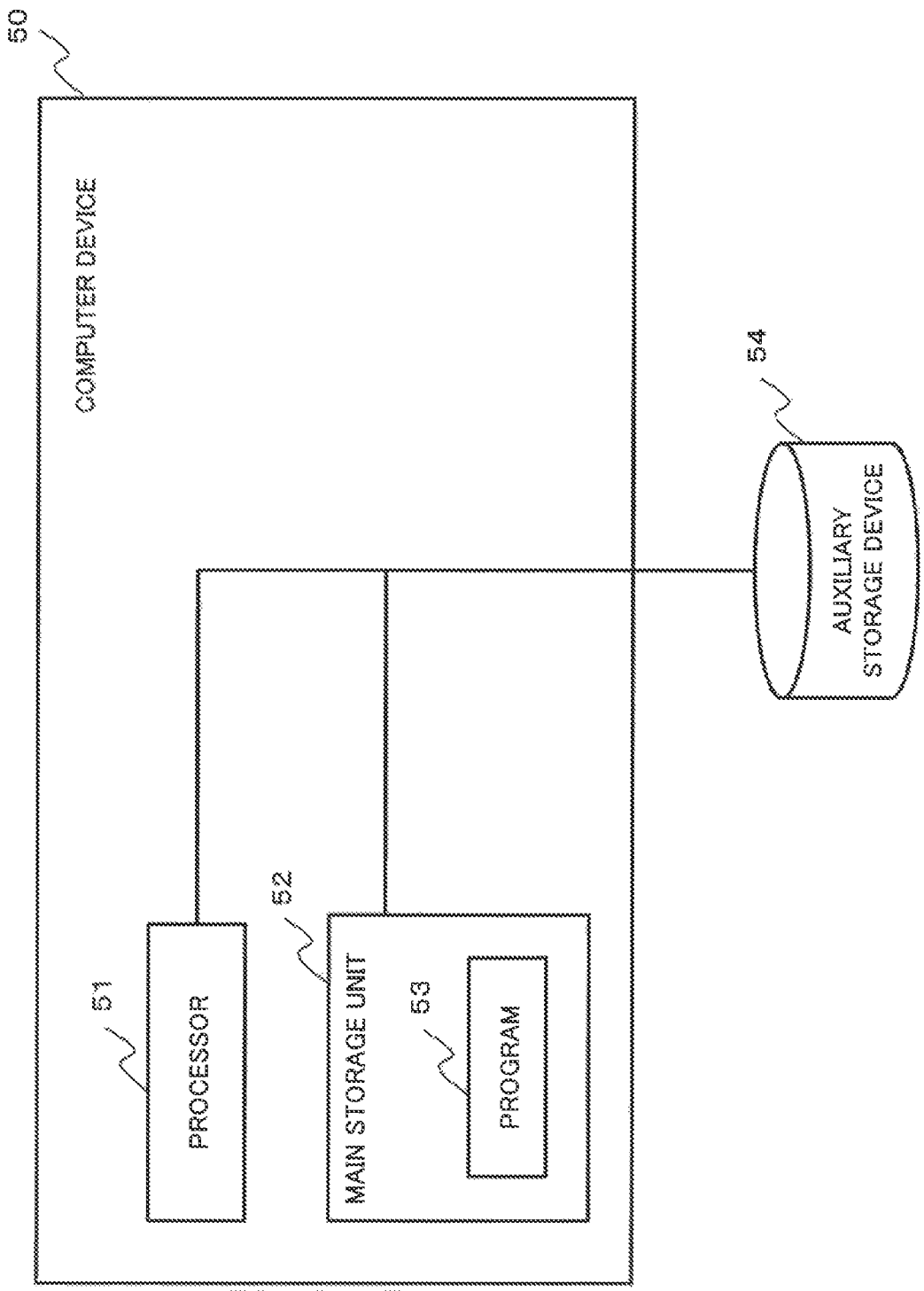

DATA MANAGEMENT SYSTEM, DATA MANAGEMENT DEVICE, DATA MANAGEMENT METHOD, AND STORAGE MEDIUM

CROSS REFERENCE TO RELATED APPLICATIONS

This application is a National Stage of International Application No. PCT/JP2015/004478, filed on Sep. 3, 2015, which claims priority from Japanese Patent Application No. 2014-182816, filed on Sep. 9, 2014, the contents of all of which are incorporated herein by reference in their entirety.

TECHNICAL FIELD

The present invention relates to a data management system, a data management device, a data management method, and a program, and particularly relates to a data management system, a data management device, a data management method, and a program that manage tree structure data that are used for searching data sets having hierarchical inclusion relations.

BACKGROUND ART

Search systems for images and videos sometimes use a search index with a tree structure. The search systems are required to access such a tree structure efficiently. Various technologies for this purpose have been disclosed.

A device disclosed in PTL 1 prepares a quick reference table for nodes in a large tree to achieve an improvement in access efficiency.

NPL 1 discloses an index data structure for speeding up similarity searches of images, videos, and the like (hereinafter, referred to as data elements). In similarity searches of data elements, for example, data that represent characteristics of the data elements and that are referred to as feature quantities are used. A distance between feature quantities of two data elements is used as a scale indicating similarity between the two data elements. That is, in a search, data elements that have a close distance between the feature quantities thereof are determined to be similar to each other.

A tree structure that NPL 1 discloses is configured in such a way that a set A of data elements with high similarity corresponds to subtrees under a common node. In this case, an intermediate node in the subtree represents a set B of data elements that are contained in a small similarity range, that is, a subset B in the set A corresponding to all of the subtrees. With regard to two nodes connected by a direct link in the tree structure, a data set represented by nodes closer to a root includes a data set represented by nodes farther from the root. In other words, the tree structure expresses a hierarchical structure of similarity relations.

CITATION LIST

Patent Literature

[PTL 1] JP 58-3032 A

Non Patent Literature

[NPL 1] Jianquan Liu, Shoji Nishimura, and Takuya Araki, Efficient Similarity Searches Using a Tree Structure Index Based on Similarity Hierarchical Relations, The 5th Forum on Data Engineering and Information Management (DEIM 2013), Mar. 3-5, 2013, A9-1

SUMMARY OF INVENTION

Technical Problem

A tree structure expressing inclusion relations as disclosed in NPL 1 has variation in the numbers of links from the root to respective leaves depending on a distribution of feature quantities of data elements. In other words, the tree structure that NPL 1 discloses becomes an unbalanced tree.

In general, a calculation cost of an operation such as a data search over the tree structure is proportional to the number of links from the root to leaves. When the tree structure is balanced, the number of links for the tree structure becomes $O(\log N)$, where N (N is an integer) denotes the number of pieces of data, which makes it possible to perform an efficient data operation. However, when the tree is an unbalanced tree, the number of links from the root to leaves becomes $O(N)$ in the worst case, which makes it impossible to perform an efficient data operation.

In order to avoid such a situation, tree rotation is used. Performing tree rotation enables a tree structure to be kept balanced.

FIG. 7 illustrates a specific example of tree rotation. A tree rotation involves three nodes (nodes A, B, and D in the example) and three links. In the example, a tree rotation is an operation of transferring the node B to the position of the node A. That is, a tree rotation causes a link $\alpha$ to the node A to be changed to a link $\alpha'$ referring to the node B and a link $\beta$ from the node A to the node B to be changed to a link $\gamma'$ from the node A to the node D. Further, a link $\gamma$ from the node B to the node D is changed to a link $\beta'$ from the node B to the node A.

This example is an example of a clockwise tree rotation operation. A counterclockwise tree rotation operation is performed in accordance with a procedure that proceeds in the opposite direction to the above-described procedure. A tree rotation decreases the height of the subtree on one side by one level and increases the height of the subtree on the other side by one level. When appropriate intermediate nodes are selected and tree rotation operations are performed, the numbers of links linking nodes up to all the leaf nodes level out to approximately the same number. As a specific example of making the height of a tree balanced by means of tree rotation, balanced trees, such as a red-black tree and an AVL tree (Adelson-Velskii and Land's tree), have been known well.

However, tree rotation cannot be applied to a tree structure in NPL 1. That is because the tree structure in NPL 1 expresses a hierarchical structure of similarity relations by means of vertical relations in the tree structure. A tree structure transformed by tree rotation becomes unable to express a proper hierarchical structure of sets of data elements. As illustrated in FIG. 7, a tree rotation reverses the vertical relation between the nodes A and B. In addition, the relation between the nodes B and D is changed to the relation between the nodes A and D.

As a result of tree rotation being unable to be performed, the tree structure in NPL 1 cannot be kept balanced, which has made it difficult to achieve an efficient data operation targeting the tree structure.

In the case in which the number of nodes at higher levels of the tree increases, such as in the case in which branching takes place at a lot of higher levels of the tree, much cost is required for the device in PTL 1 checking a quick reference table, which causes access efficiency to worsen.

An object of the present invention is to provide a data management system, a data management device, a data management method, and a program for solving the above-described problems.

Solution to Problem

An aspect of the present invention is a data management system. The system includes:

a tree-structure-holding means for storing a transformed tree structure into which an original tree structure has been transformed by a rotation operation, the original tree structure being a tree structure indicating hierarchical inclusion relations among data sets associated with nodes;

an inter-data-relation-holding means for storing a reverse link, the reverse link being a link between nodes the levels of which have been reversed by the rotation operation; and an inter-link-relation-holding means for storing a temporarily placed link in association with the reverse link, the temporarily placed link being a link to a node that has been transferred from immediately below an ex-lower-level node to immediately below an ex-upper-level node, the ex-lower-level node and the ex-upper-level node being nodes the levels of which have been reversed.

Other aspect of the present invention is a data management device. The device includes:

a tree-structure-holding means for storing a transformed tree structure into which an original tree structure has been transformed by a rotation operation, the original tree structure being a tree structure indicating hierarchical inclusion relations among data sets associated with nodes, an inter-data-relation-holding means for storing a reverse link, the reverse link being a link between nodes the levels of which have been reversed by the rotation operation, and an inter-link-relation-holding means for storing a temporarily placed link in association with the reverse link, the temporarily placed link being a link to a node that has been transferred from immediately below an ex-lower-level node to immediately below an ex-upper-level node, the ex-lower-level node and the ex-upper-level node being nodes the levels of which have been reversed, the data management device comprising a node-search means that is a means for, based on the transformed tree structure, searching an object node that is a node associated with a data set including an input data set, the node-search means, a) if an object node has a reverse link, further searching a node at a destination of the temporarily placed link associated with the reverse link, and, b) if a node other than an object node has a reverse link, further searching a node at a destination of the reverse link.

Other aspect of the present invention is a data management method. The method includes the steps of:

storing a transformed tree structure into which an original tree structure has been transformed by a rotation operation, the original tree structure being a tree structure indicating hierarchical inclusion relations among data sets associated with nodes;

storing a reverse link, the reverse link being a link between nodes the levels of which have been reversed by the rotation operation; and storing a temporarily placed link in association with the reverse link, the temporarily placed link being a link to a node that has been transferred from immediately below an ex-lower-level node to immediately below an ex-upper-level node, the ex-lower-level node and the ex-upper-level node being nodes the levels of which have been reversed.

Other aspect of the present invention is a storage medium recording a program. The program causes a computer execute:

processing of storing a transformed tree structure into which an original tree structure has been transformed by a rotation operation, the original tree structure being a tree structure indicating hierarchical inclusion relations among data sets associated with nodes;

processing of storing a reverse link, the reverse link being a link between nodes the levels of which have been reversed by the rotation operation; and processing of storing a temporarily placed link in association with the reverse link, the temporarily placed link being a link to a node that has been transferred from immediately below an ex-lower-level node to immediately below an ex-upper-level node, the ex-lower-level node and the ex-upper-level node being nodes the levels of which have been reversed.

Advantageous Effects of Invention

A data management device according to the present invention may perform a rotation operation on a tree structure that indicates hierarchical inclusion relations among data sets associated with nodes. As a result, the device may make the tree structure balanced and perform search and insertion operations of a data element efficiently.

BRIEF DESCRIPTION OF DRAWINGS

FIG. 2B is an operation flowchart (2/2) of the node selection unit 13;

FIG. 3 is an operation flowchart of a rotation operation unit 14;

FIG. 11 is a configuration diagram of a computer device 50.

DESCRIPTION OF EMBODIMENTS

First Example Embodiment

<Overview>

A data management system 30 of the present example embodiment uses a tree structure described in NPL 1 in order to perform a search for a data element. As used herein, a data element is an image, a video, or the like and is data to be searched for. The data management system 30 uses the tree structure described in NPL 1 as an index for searching for a data element.

The tree structure indicates hierarchical inclusion relations among sets of data elements that are associated with nodes. With regard to two nodes between which a direct link is established in the tree structure, a set A of data elements that is associated with a node or nodes closer to a root includes a set B of data elements that is associated with nodes farther from the root. In the case in which the hierarchical inclusion relations among the sets are defined on the basis of similarity, the set B is a subset in the set A and is a set of data elements that have stronger similarity. For example, in a case in which the set A is a set of images of cars, the set B is a set of images of passenger cars or a set of images of cars other than the passenger cars.

The reason for the height of the tree described in NPL 1 not being balanced is that the tree expresses logical relations represented by hierarchical relations among data elements and physical relations represented by a tree structure in one-to-one correspondence with each other. Accordingly, the data management system 30 of the present example embodiment, by means of adding additional information to a physical structure represented by a balanced tree and using the information in a process of performing operations on the tree structure, expresses hierarchical relations among data elements using a balanced tree.

That is, a tree structure that the data management system 30 uses expresses each relation between nodes by a direction of a relation given to a link between the nodes instead of by a vertical relation in the tree structure. In addition, the data management system 30 holds information expressing a gap between a balanced tree and a structure to be expressed. Furthermore, by means of including a node search means and a tree rotation operation means that use such information, the data management system 30 achieves a search system.

Figure 8:
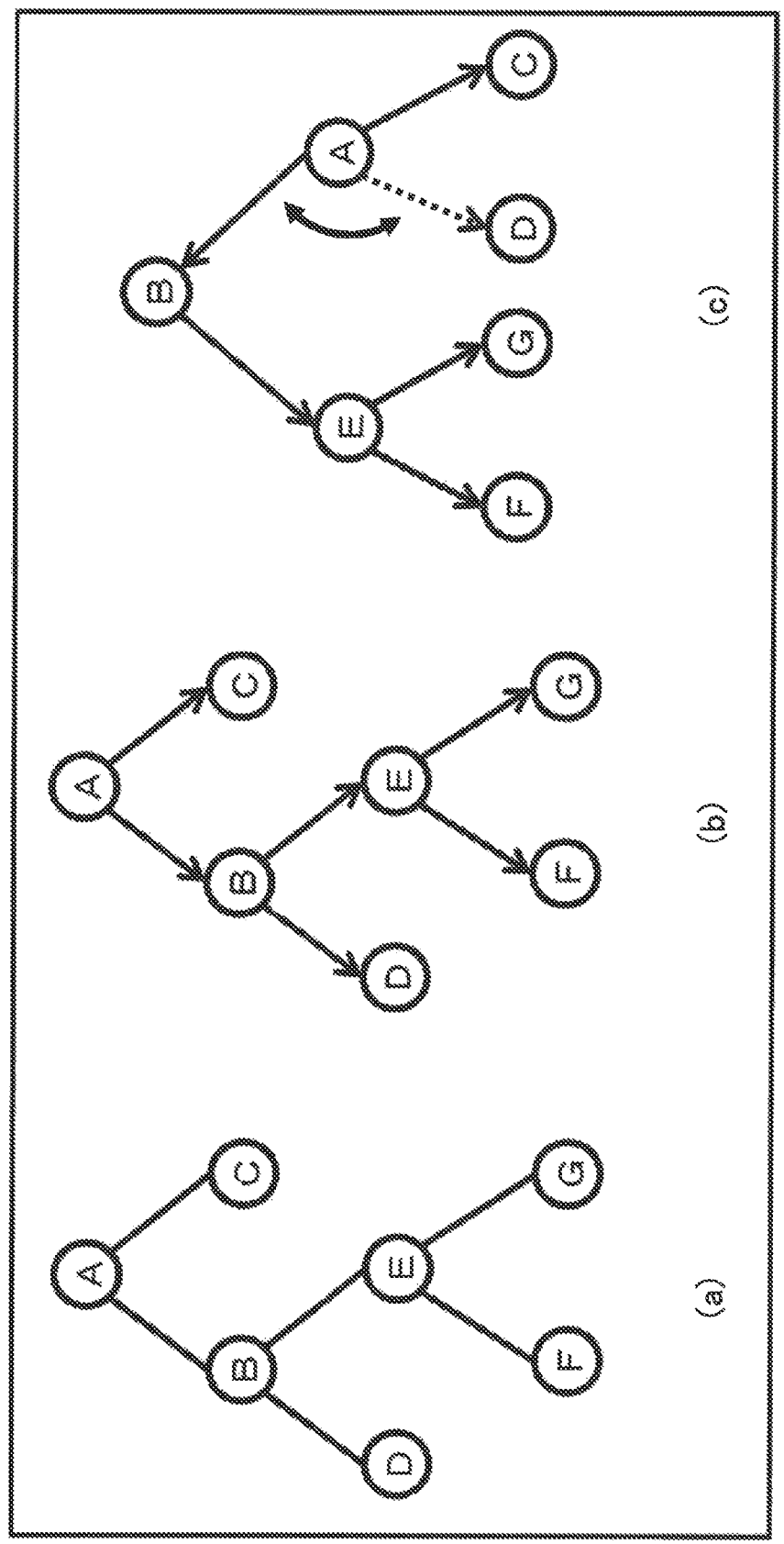
FIG. 8 illustrates an overview of a transformation that the data management system 30 performs on a tree structure.

FIG. 8 illustrates an overview of a transformation that the data management system 30 performs on a tree structure. A tree structure (hereinafter, referred to as an original tree structure) that the data management system 30 originally includes indicates hierarchical relations among data with vertical relations in the tree structure, as part (a) of FIG. 8 illustrates.

In order to separate the vertical relations in the tree structure from the hierarchical relations among data, the data management system 30 first gives information expressing the hierarchical relations to the links. Part (b) of FIG. 8 illustrates the given information as arrows. The data management system 30 next transforms the tree into a balanced tree. In other words, the data management system 30, while maintaining the directions of the arrows expressing the hierarchical relations, performs a tree rotation operation(s) so that the tree becomes a balanced tree. Part (c) of FIG. 8 illustrates a result from the rotation operation.

Since a tree that is not a balanced tree intrinsically is expressed as a balanced tree at this time, a gap is created. For example, a node D, which should be originally connected below a node B directly, is connected below a node A. A link from the node A to the node D is not a link that expresses an original direct hierarchical relation. Part (c) of FIG. 8 illustrates the link as a dotted arrow.

A position at which the link should be originally placed is a position at which a link between the nodes A and B is placed. A double-headed arrow illustrated in part (c) of FIG. 8 indicates an association with the link illustrated by a dotted arrow, the association being given to another link that is placed at a position at which the link illustrated by a dotted arrow should be originally placed.

Part (c) of FIG. 8 shows that, if appropriate information is added, a balanced tree, which is a tree structure after a rotation operation(s) has/have been performed (hereinafter, referred to as a transformed tree structure), is capable of expressing a tree structure that is equivalent to the original hierarchical relations. The appropriate information mentioned above is, for example, information of the directions of relations among nodes expressing hierarchical relations (the directions of the arrows of links) and information of a gap from the original tree structure (a double-headed arrow for association with a dotted arrow). In other words, by performing maintenance of such additional information in a proper manner in performing a tree rotation operation and following a balanced tree using the additional information in performing a search, the data management system 30 achieves an operation on the original hierarchical relations as an operation on the balanced tree.

In the following description, a regular link means a link the vertical relation and hierarchical relation of which in a tree structure matches each other (a link illustrated by a downward arrow in FIG. 8). A reverse link means a link the vertical relation and hierarchical relation of which in a tree structure have opposite directions (a link illustrated by an upward arrow in FIG. 8). A temporarily placed link means a link that, as a link from the node A to the node D in part (c) of FIG. 8, is not placed at a position indicating an original hierarchical relation (a link illustrated by a dotted line in FIG. 8).

In this case, a link associated with a temporarily placed link is always a reverse link. That is because the temporarily placed link is created only when the reverse link is created because of a tree rotation.

Figure 9:
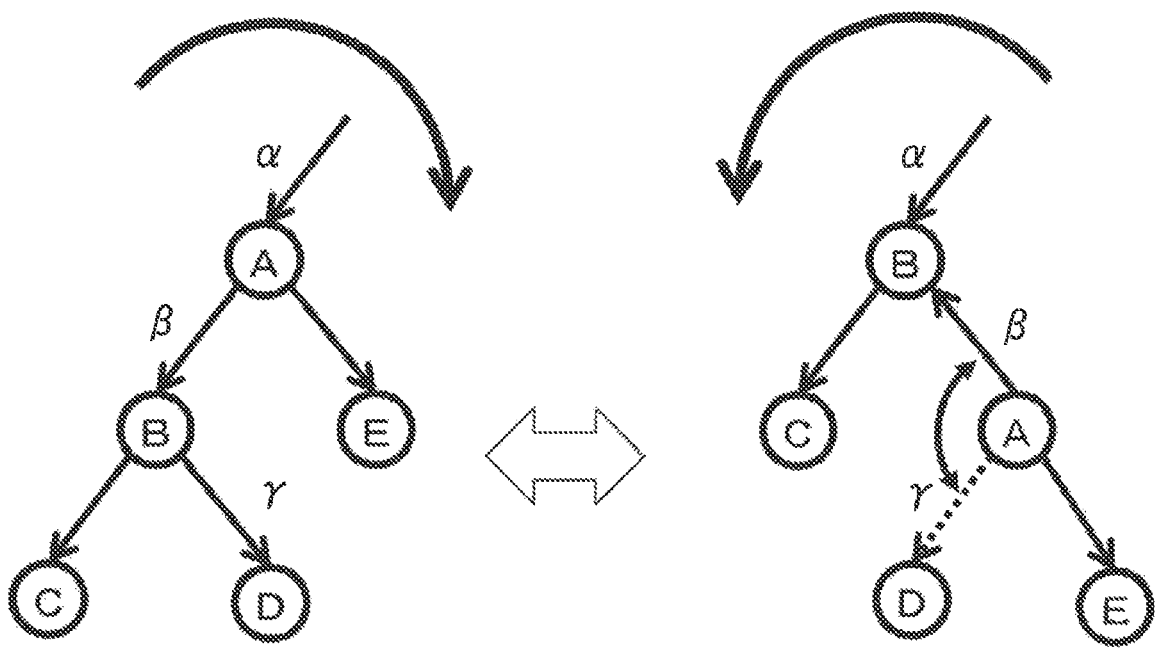
FIG. 9 illustrates two cases of tree rotation operations.

There exist two cases of tree rotation operations. When three links related to a rotation are denoted by $\alpha$, $\beta$, and $\gamma$, the first case is a case in which the link $\beta$ is a regular link, as the left side of FIG. 9 illustrates, and the second case is a case in which the link $\beta$ is a reverse link (the right side of FIG. 9).

First, in the case in which the link $\beta$ is a regular link, the data management system 30 alters the link into a reverse link and reverses the positional relation between both end nodes of the link. In addition, the data management system 30 alters the link $\gamma$ into a temporarily placed link and associates the temporarily placed link with the reverse link. Next, in the case in which the link $\beta$ is a reverse link, the data management system 30 selects a link associated with the reverse link as the link $\gamma$ and performs a procedure that proceeds in the opposite direction to the above-described procedure.

Figure 10:
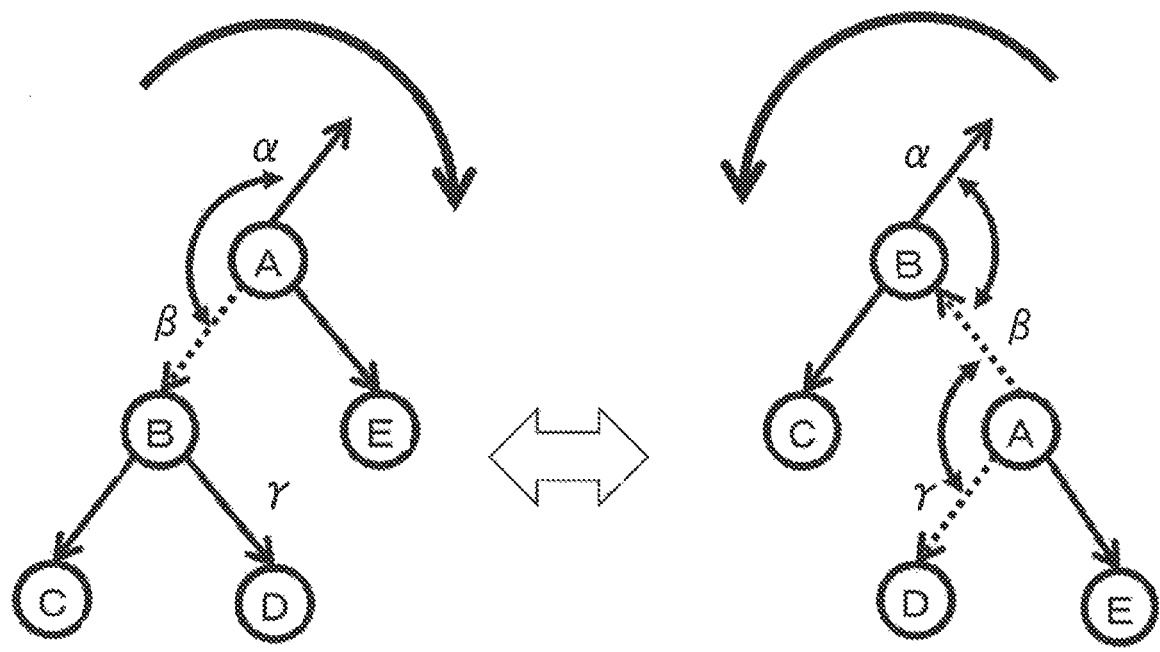
FIG. 10 illustrates rotation operations performed on temporarily placed links.

When performing a tree rotation operation in accordance with the afore-described procedure, the data management system 30 does not have to take into consideration whether or not the link $\beta$ is a temporarily placed link. That is because whether a link is a regular link or reverse link and whether or not the link is a temporarily placed link are attributes that are independently given to the link. For example, as illustrated in FIG. 10, regardless of whether or not the link $\beta$ is a temporarily placed link, the data management system 30 is able to perform a tree rotation operation in the same procedure, as described above.

The above is a description of a tree rotation operation that the data management system 30 performs. On the other hand, the data management system 30 performs a tree search operation as follows.

In the case in which the lower side links of a node are regular links, the data management system 30 follows a link satisfying a condition for following a regular link in the same manner as in an operation on the original hierarchical structure. In the case in which a reverse link is included, the data management system 30 determines whether or not the reverse link satisfies a condition for following a temporarily placed link associated with the reverse link, and, if satisfying, follows the destination of the temporarily placed link. In the case in which neither a condition for following a regular link nor a condition for following a temporarily placed link is satisfied, the data management system 30 moves to a node at the destination of the reverse link and determines a condition for following a link other than the temporarily placed link associated with the reverse link.

The tree search operation is performed in the direction from the root node to leaf nodes of the balanced tree without backtracking. Therefore, the tree search operation can be performed in O(log N) operations for the number N of nodes of the tree.

The tree search operation is a basic operation for data operations, such as data insertion into a tree and data search in a tree. As described above, the data management system 30 of the present example embodiment keeps a tree balanced by means of tree rotation and performs an efficient tree search operation on the balanced tree. Therefore, the data management system 30 of the present example embodiment may speed up data operations.

The above-described tree rotation operation is performed by a rotation operation unit 14 of the data management system 30. The above-described tree search operation is performed by a node selection unit 13. The rotation operation unit 14 and the node selection unit 13 will be described later.

Since the tree is kept balanced, the data management system 30 may select a link close to the root node and divide the tree data substantially equally. This feature will be described in a second example embodiment.

<Configuration>

Figure 1:
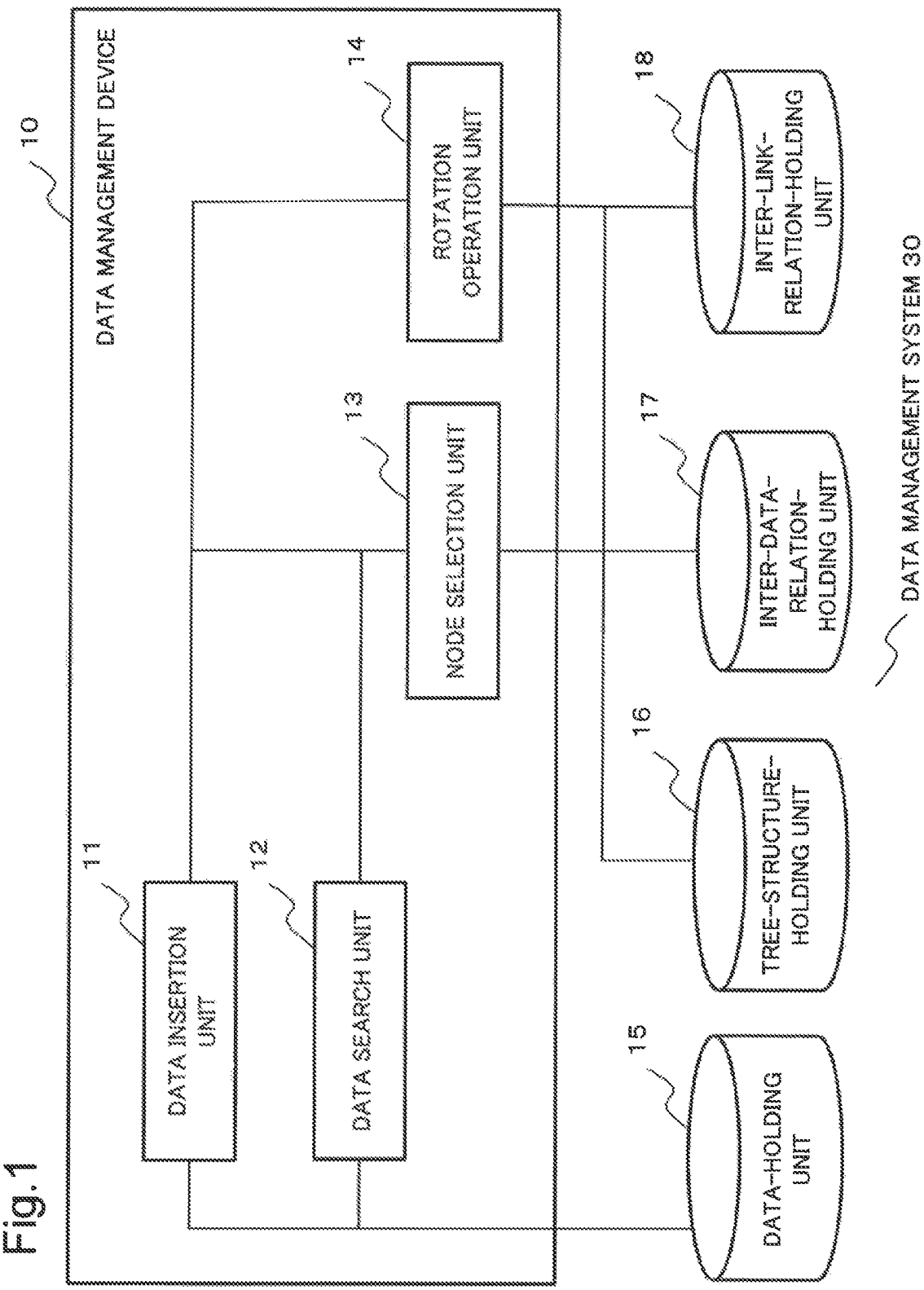
FIG. 1 is a configuration diagram of a data management system 30 of a first example embodiment.

FIG. 1 is a diagram illustrating a configuration of the data management system 30 of the present example embodiment. The data management system 30 includes a data management device 10 and a data-holding unit 15, a tree-structure-holding unit 16, an inter-data-relation-holding unit 17, and an inter-link-relation-holding unit 18, which are connected to the data management device 10. The data management device 10 includes a data insertion unit 11, a data search unit 12, the node selection unit 13, and the rotation operation unit 14.

The data insertion unit 11 adds a data element to the data-holding unit 15 and determines a position, in a tree, at which a node is to be added. The data search unit 12 searches, in a tree, for a position at which an object data element is placed.

The node selection unit 13, referring to the tree-structure-holding unit 16, the inter-data-relation-holding unit 17, and the inter-link-relation-holding unit 18, selects a node to be followed next. The rotation operation unit 14 operates the tree-structure-holding unit 16, the inter-data-relation-holding unit 17, and the inter-link-relation-holding unit 18 to perform a tree rotation operation on a tree so that the height of the tree becomes balanced.

The data-holding unit 15 stores data elements. The tree-structure-holding unit 16 stores a tree that is made up of nodes and links. Both units may be integrated into a unit.

The inter-data-relation-holding unit 17 stores discrimination information that indicates whether each tree link stored in the tree-structure-holding unit 16 is a regular link or reverse link. The inter-data-relation-holding unit 17 may store either only reverse links or regular links. Furthermore, the inter-data-relation-holding unit 17 may store discrimination information indicating whether or not each tree link is a temporarily placed link.

The inter-link-relation-holding unit 18, with respect to each reverse link, stores a temporarily placed link associated with the reverse link.

The data-holding unit 15, the tree-structure-holding unit 16, the inter-data-relation-holding unit 17, and the inter-link-relation-holding unit 18 are storage devices, such as a disk device and a semiconductor memory device.

The data insertion unit 11, the data search unit 12, the node selection unit 13, and the rotation operation unit 14 are configured with logical circuits.

The data management device 10 may be implemented using a computer device 50. FIG. 11 is a configuration diagram of the computer device 50. The computer device 50 includes a processor 51 and a main storage unit 52 and is connected to an auxiliary storage device 54. The main storage unit 52 is a storage device such as a semiconductor memory device. The auxiliary storage device 54 is a storage device such as a disk device or a semiconductor memory device. The processor 51 is capable of performing reading and writing from and to the main storage unit 52 and the auxiliary storage device 54.

The data insertion unit 11, the data search unit 12, the node selection unit 13, or the rotation operation unit 14 may be achieved by a program 53 that is stored in the main storage unit 52 and executed by the processor 51. That is, by means of executing the programs 53, the processor 51 may execute processing that the data search unit 12, the node selection unit 13, or the rotation operation unit 14 performs.

In this case, the data-holding unit 15, the tree-structure-holding unit 16, the inter-data-relation-holding unit 17, and the inter-link-relation-holding unit 18 may be achieved by the auxiliary storage device 54. The program 53 is stored in the auxiliary storage device 54 at the beginning and may be, in performing, for example, initial setting of the computer device 50, loaded into the main storage unit 52.

The data management system 30 of the present example embodiment may, by means of holding and using information of inter-node relations and reverse links in addition to information of a tree structure, express hierarchical relations based on data similarity as a balanced tree. With this configuration, the data management system 30 enables an improvement in access efficiency to be achieved.

<Supplement on Implementation>

The tree-structure-holding unit 16 may store nodes and links in a tree structure as objects and references to the nodes, respectively. In this case, processing of following a link in a tree search can be achieved as processing of accessing a node to which a node refers. In addition, a rotation operation can be achieved by means of an exchange of references.

The inter-data-relation-holding unit 17 may be achieved by means of making each link have a flag indicating whether the link is a regular link or reverse link. In the case in which a link is achieved as a reference to a node, the link itself cannot have such a flag. In such a case, for example, a reference source node may have a field for holding such a flag.

The inter-link-relation-holding unit 18 may be achieved by means of making each node object with a reverse link have a field for holding a reference to a field holding a temporarily placed link. The data search unit 12 and the like may, by way of this field, access a child node at the destination of a temporarily placed link and identify a temporarily placed link that should not be followed.

An object may represent a link, and the link may have a flag expressing a relation among data or a field having a reference to an associated link.

<Operation>

The data insertion unit 11 and the data search unit 12 provide the node selection unit 13 with conditions for determining a) a node at which information of an added data element and the like is to be inserted and b) a node at which information of a data element to be searched for is recorded, respectively. On receiving such conditions, the node selection unit 13 searches the tree-structure-holding unit 16 for an object node. The above-mentioned information of a data element to be registered to a node is, for example, a pointer to the data element and a feature quantity of the data element.

When registering a data element input from the outside into the data-holding unit, the data insertion unit 11 performs the above-described operation. After the above-described operation has been performed, the data search unit 12 obtains a data element to be searched for by way of a pointer stored in the obtained node.

The data insertion unit 11 and the data search unit 12 may operate in accordance with a procedure described in NPL 1 or the like. In the case in which a tree structure has been altered by addition of a data element, however, the data insertion unit 11 keeps the tree structure balanced by way of the rotation operation unit 14.

Figure 2A:
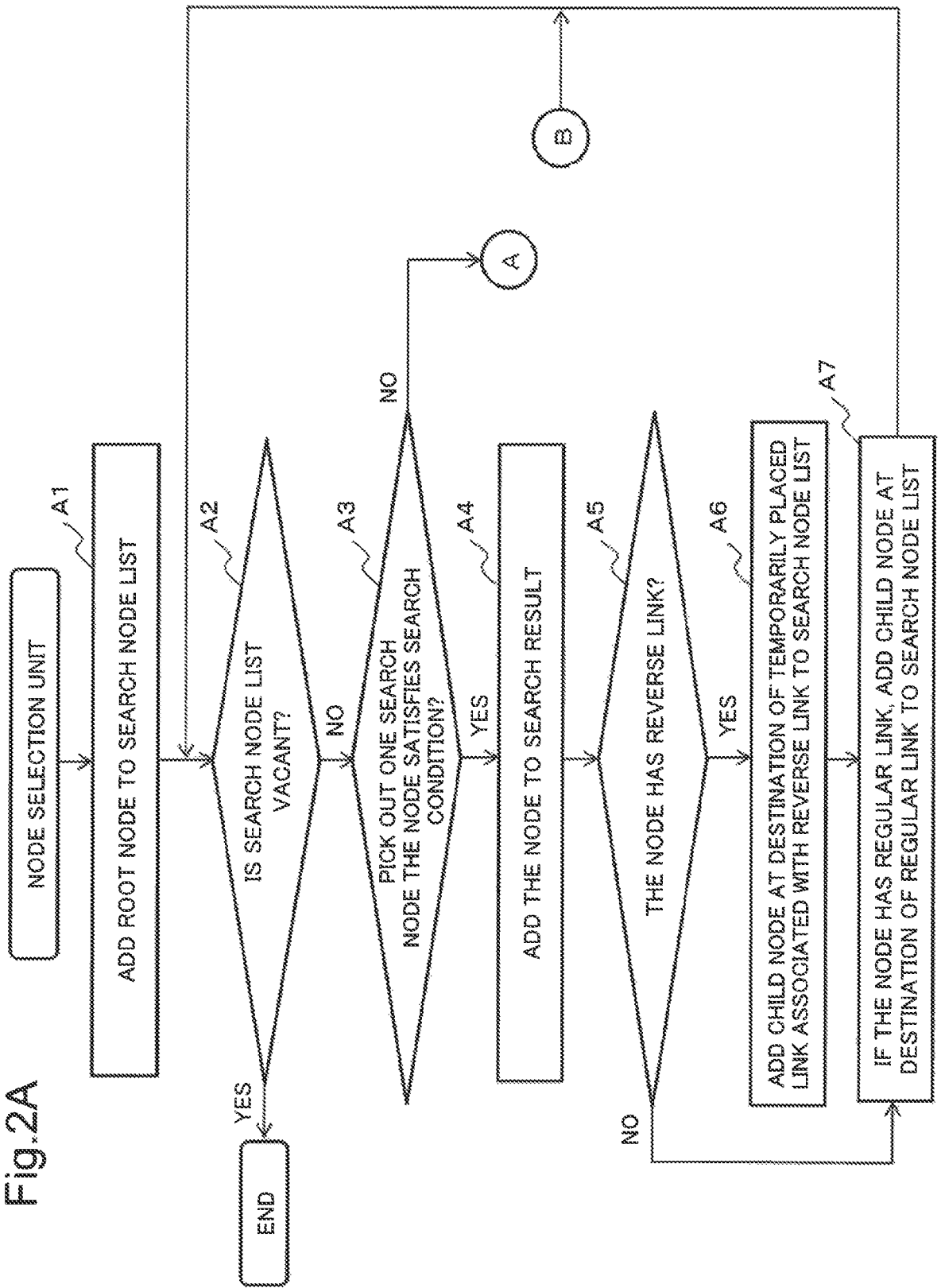
FIG. 2A is an operation flowchart (1/2) of a node selection unit 13.

FIGS. 2A and 2B are operation flowcharts of the node selection unit 13.

First, the node selection unit 13 picks out the root node from the tree-structure-holding unit 16 and adds the root node to a search node list (step A1). The node selection unit 13 repeats the following series of operations until the search node list becomes vacant (step A2).

The node selection unit 13 picks out a search node from the search node list and determines whether or not the node satisfies a search condition provided from the data insertion unit 11 or the data search unit 12 (step A3).

A node satisfies a search condition in the case in which there is a possibility that a set of data elements associated with the node include a data element or a set data elements to be searched for. For example, in the case in which a search condition is to search for a "taxi" and a node is associated with a set of data elements of "passenger cars", the node satisfies the search condition. In a node, a condition defining a set associated with the node, for example, data representing "passenger cars", is included. The node selection unit 13 compares both conditions and, when a set satisfying the condition included in the node contains a set satisfying the search condition, determines that "the node satisfies the search condition".

If the node picked out from the search node list in step A3 satisfies the search condition ("YES" in step A3), the node selection unit 13 adds the node to a search result (step A4). The node selection unit 13 refers to the inter-data-relation-holding unit 17 and examines whether the node has a reverse link (step A5). If the node has a reverse link, the node selection unit 13 refers to the inter-link-relation-holding unit 18, obtains a temporarily placed link associated with the reverse link, refers to the tree-structure-holding unit 16, and adds a child node at the destination of the temporarily placed link to the search node list (step A6).

Next, if the node picked out from the search node list in step A3 has a regular link, the node selection unit 13 adds a child node at the destination of the regular link to the search node list (step A7). Subsequently, the node selection unit 13 returns to step A2.

In the case in which the node picked out from the search node list in step A3 has no reverse link ("NO" in step A5), if the node has a regular link, the node selection unit 13 also adds a child node at the destination of the link to the search node list (step A7). In the case in which the node has two regular links, the node selection unit 13 adds child nodes at the destinations of both links to the search node list.

If the node picked out from the search node list in step A3 does not satisfy the search condition ("NO" in step A3), the node selection unit 13 refers to the inter-data-relation-holding unit 17 and examines whether or not the node has a reverse link (step A8). If the node has a reverse link, the node selection unit 13 adds a node at the destination of the reverse link to the search node list and remove a node at the destination of a temporarily placed link associated with the reverse link from the search node list (step A9). Subsequently, the node selection unit 13 returns to step A2.

If the node does not have a reverse link ("NO" in step A8), the node selection unit 13 returns to step A2.

FIG. 3 is an operation flowchart of the rotation operation unit 14.

First, the rotation operation unit 14 determines which link is to be rotated in order to make a tree balanced (step B1). The rotation operation unit 14 may perform this determination by means of a well-known method used in performing tree rotation.

Next, the rotation operation unit 14 refers to the inter-data-relation-holding unit 17 and determines whether or not the link is a regular link (step B2). If the link is a regular link, the rotation operation unit 14 operates the tree-structure-holding unit 16 to perform a tree rotation operation. Further, the rotation operation unit 14 records that the link has been changed into a reverse link into the inter-data-relation-holding unit 17 and records the reverse link and a link having been changed into a temporarily placed link in association with each other into the inter-link-relation-holding unit 18 (step B3).

If a link to be rotated is a reverse link ("NO" in step B2), the rotation operation unit 14 operates the tree-structure-holding unit 16 to perform a tree rotation operation. Further, the rotation operation unit 14 records that the link has been changed into a regular link into the inter-data-relation-holding unit 17 and removes an association of the link with a link that has been a temporarily placed link from the inter-link-relation-holding unit 18 (step B4).

<Advantageous Effect>

The data management system 30 of the present example embodiment may perform a rotation operation on a tree structure that indicates hierarchical inclusion relations among data sets associated with nodes. As a result, it is possible to make the tree structure balanced and perform search and insertion operations of a data element efficiently.

That is because the data management system 30 of the present example embodiment holds a balanced tree with information of relations among nodes and associations among links added and searches the tree using such information.

<Variation>

The data-holding unit 15, the tree-structure-holding unit 16, the inter-data-relation-holding unit 17, and the inter-link-relation-holding unit 18 may be configured with a portion or all thereof integrated.

A tree structure before a rotation operation, which is stored in the tree-structure-holding unit 16, indicates hierarchical inclusion relations among sets of data elements associated with nodes, as described above. The inclusion relations do not always have to be determined based on similarity. The inclusion relations may be determined based on another basis, for example, determined based on proximity relations among shooting places of video data.

Second Example Embodiment

<Configuration>

Figure 4:
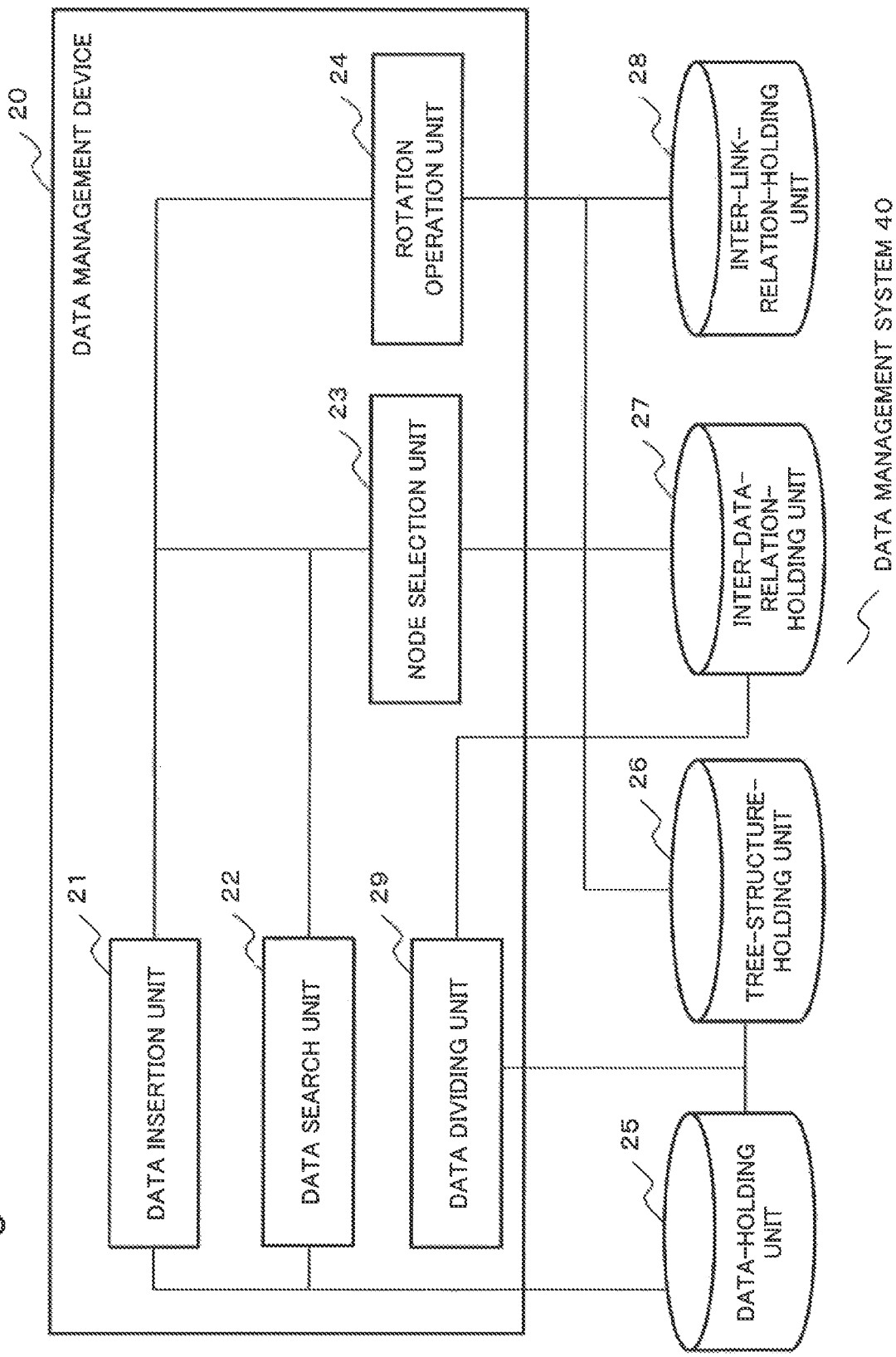
FIG. 4 is a configuration diagram of a data management system 40 according to a second example embodiment.

FIG. 4 is a configuration diagram of a data management system 40 according to a second example embodiment. A data management device 20 of the data management system 40 of the present example embodiment operates in a distributed environment. Therefore, the data management device 20 of the present example embodiment includes a data dividing unit 29 in addition to the configuration of the first example embodiment. The data dividing unit 29 determines division of data elements and a tree structure, which are arranged in respective distributed server devices. The data dividing unit 29 may divide data substantially equally.

A data insertion unit 21, a data search unit 22, a node selection unit 23, and a rotation operation unit 24, unless otherwise noted, function in the same manner as, respectively, the data insertion unit 11, the data search unit 12, the node selection unit 13, and the rotation operation unit 14 in the first example embodiment.

A data-holding unit 25, a tree-structure-holding unit 26, an inter-data-relation-holding unit 27, and an inter-link-relation-holding unit 28, unless otherwise noted, also function in the same manner as, respectively, the data-holding unit 15, the tree-structure-holding unit 16, the inter-data-relation-holding unit 17, and the inter-link-relation-holding unit 18 in the first example embodiment.

The data-holding unit 25, the tree-structure-holding unit 26, the inter-data-relation-holding unit 27, and the inter-link-relation-holding unit 28 are storage devices, such as a disk device and a semiconductor memory device.

The data insertion unit 21, the data search unit 22, the node selection unit 23, the rotation operation unit 24, and the data dividing unit 29 are configured with logical circuits. The data insertion unit 21, the data search unit 22, the node selection unit 23, the rotation operation unit 24, or the data dividing unit 29 may be achieved by a program 53, which is stored in a main storage unit 52 of a computer device 50 in FIG. 11 and executed by a processor 51.

As with the first example embodiment, the data management system 40 of the present example embodiment, by means of holding and using information of relations among nodes and reverse links in addition to information of a tree structure, may express hierarchical relations based on data similarity as a balanced tree. With this configuration, the data management system 40 enables equal division of data to be achieved in addition to an improvement in access efficiency.

<Operation>

Figure 5:
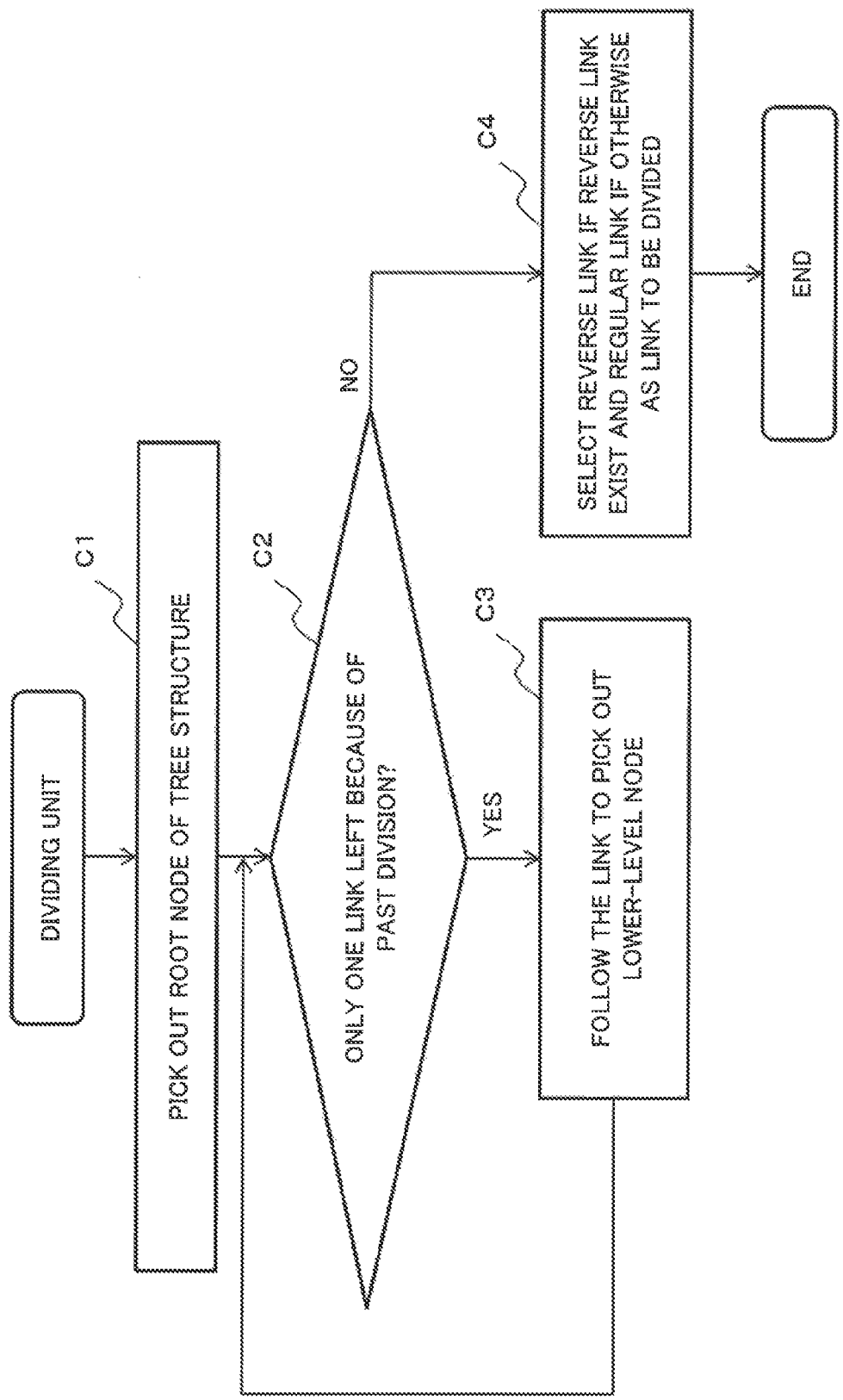
FIG. 5 is an operation flowchart of a data dividing unit 29.

FIG. 5 is an operation flowchart of the data dividing unit 29.

First, the data dividing unit 29, which divides data, of the data management device 20 accesses the tree-structure-holding unit 26 to pick out the root node (step C1 in FIG. 5). Next, the data dividing unit 29 checks whether or not only one link is left for the node as a result of division that has been already performed (step C2). If only one link is left ("YES" in step C2), the data dividing unit 29 follows the link to pick out a node at the lower-level of the link (step C3).

By means of the series of steps, the data dividing unit 29 finds a node for which a plurality of links are left and that is closest to the root node.

When finding a tree for which a plurality of links are left ("NO" in step C2), the data dividing unit 29 accesses the inter-data-relation-holding unit 27 to select, if a reverse link exists, the reverse link or else a regular link as a link at which the tree is divided (step C4).

The data dividing unit 29 transmits a subtree under the selected link and data elements associated with the nodes of the subtree to another device, for example, another data management device 20 arranged in a distributed manner.

<Advantageous Effect>

The data dividing unit 29 may divide data substantially equally. That is because the data dividing unit 29 divides data at an upper level of a tree structure. If the numbers of pieces of data related to terminal nodes are substantially the same, the numbers of data elements associated with divided subtrees become approximately the same. Furthermore, the data dividing unit 29 may divide nodes having close hierarchical relations collectively. That is because the data dividing unit 29 selects a reverse link in a prioritized manner as a link at which division is performed.

Third Example Embodiment

Figure 6:
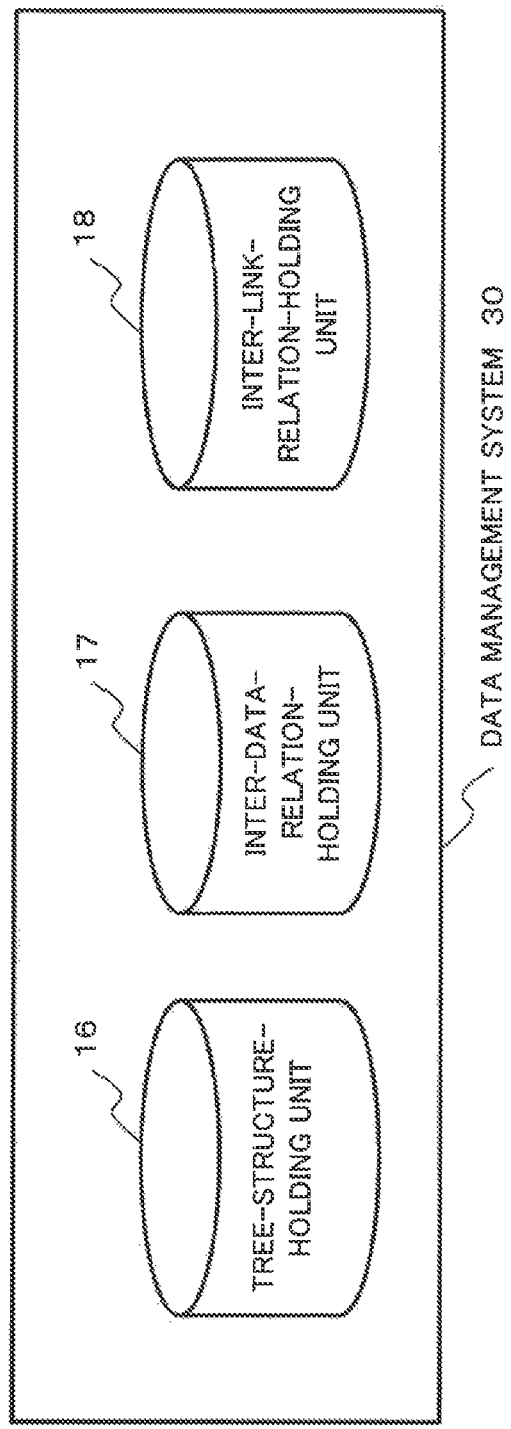
FIG. 6 is a configuration diagram of a data management system 30 according to a third example embodiment.
Figure 7:
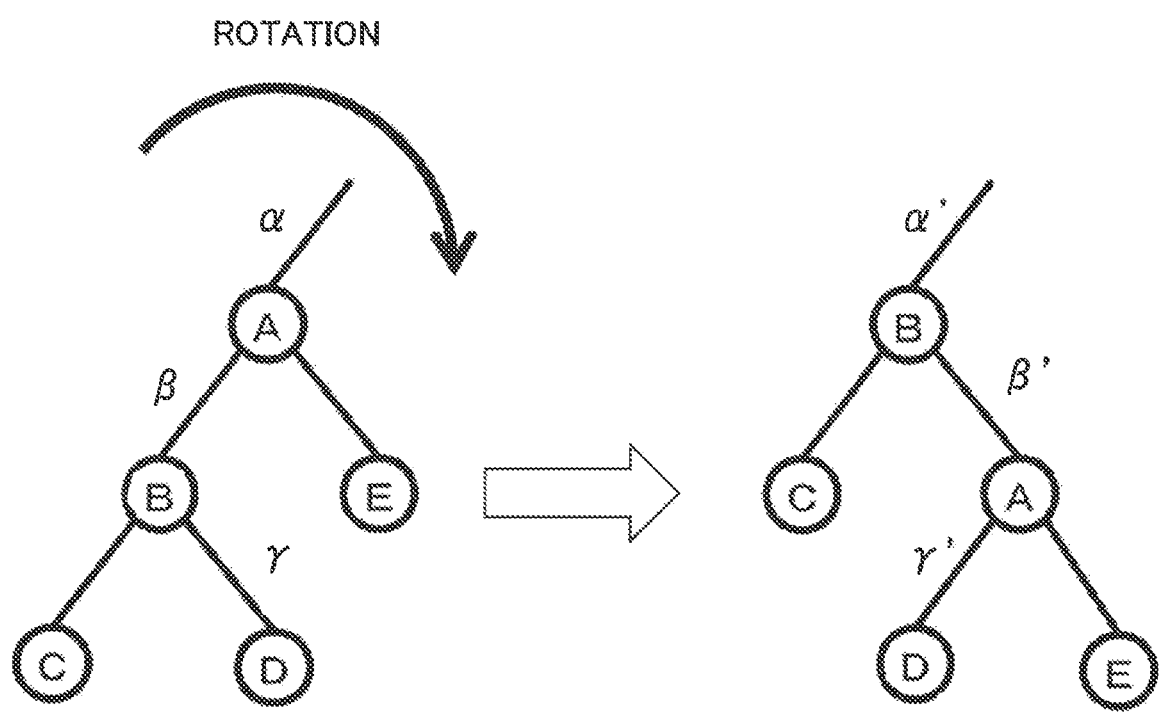
FIG. 7 illustrates a specific example of tree rotation.

FIG. 6 is a configuration diagram of a data management system 30 according to a third example embodiment. The data management system 30 includes a tree-structure-holding unit 16, an inter-data-relation-holding unit 17, and an inter-link-relation-holding unit 18.

The tree-structure-holding unit 16 stores a transformed tree structure into which an original tree structure has been transformed by a rotation operation(s), the original tree structure being a tree structure indicating hierarchical inclusion relations among data sets associated with nodes. The inter-data-relation-holding unit 17 stores a reverse link(s), the reverse link(s) being a link(s) between nodes the levels of which have been reversed by the rotation operation(s). The inter-link-relation-holding unit 18 stores a temporarily placed link(s) in association with the reverse link(s), the temporarily placed link(s) being a link(s) to a node(s) that has/have been transferred from immediately below an ex-lower-level node(s) to immediately below an ex-upper-level node(s), the ex-lower-level node(s) and the ex-upper-level node(s) being nodes the levels of which have been reversed.

The tree-structure-holding unit 16, the inter-data-relation-holding unit 17, and the inter-link-relation-holding unit 18 are storage devices, such as a disk device and a semiconductor memory device. Therefore, the data management system 30 according to the present example embodiment is a system that stores, in a storage medium, structured data that are referred to as a so-called database.

A tree structure that the data management system 30 of the present example embodiment stores may be balanced by a rotation operation(s) while being a tree structure indicating hierarchical inclusion relations of data sets associated with nodes. As a result, a device that accesses the tree structure may perform search and insertion operations of a data element efficiently.

That is because a tree structure that the data management system 30 of the present example embodiment stores is held as a balanced tree with information of relations among nodes and associations among links added, and a device that accesses the tree structure may search the tree by use of such information.

The present invention was described above through example embodiments thereof, but the present invention is not limited to the above example embodiments. Various modifications that could be understood by a person skilled in the art may be applied to the configurations and details of the present invention within the scope of the present invention.

This application claims priority based on Japanese Patent Application No. 2014-182816, filed on Sep. 9, 2014, the entire disclosure of which is incorporated herein by reference.

REFERENCE SIGNS LIST

10 Data management device
11 Data insertion unit
12 Data search unit
13 Node selection unit
14 Rotation operation unit
15 Data-holding unit
16 Tree-structure-holding unit
17 Inter-data-relation-holding unit
18 Inter-link-relation-holding unit
30 Data management system
20 Data management device
21 Data insertion unit
22 Data search unit
23 Node selection unit
24 Rotation operation unit
25 Data-holding unit
26 Tree-structure-holding unit
27 Inter-data-relation-holding unit
28 Inter-link-relation-holding unit
29 data dividing unit
40 Data management system
50 Computer device
51 Processor
52 Main storage unit
53 Program
54 Auxiliary storage device

The invention claimed is:

1. A data management system comprising:
at least one memory configured to store computer program code; and
at least one processor configured to execute the computer program to:
store, in the at least one memory, a rotated tree structure with transformed link orientation between nodes of an original tree structure transformed by a rotation operation reversing a level between the nodes, the original tree structure indicating hierarchical inclusion relations among data sets associated with the nodes, wherein the hierarchical inclusion relations of the data sets is determined based on similarity among data elements, wherein a data set associated with a lower-level node of the original tree structure is a subset of a data set associated with an upper-level node, and the set associated with a lower-level node is made up of the data elements having stronger similarity than the data set associated with the upper-level node;
store, in the at least one memory, a reverse link, to retain the hierarchical inclusion relation indicated by the original tree structure, the reverse link being a link between an ex-lower-level node and an ex-upper-level node that have been reversed;
store, in the at least one memory, a temporarily placed link in association with the reverse link, the temporarily placed link being a link to a node that has been transferred from immediately below the ex-lower-level node to immediately below the ex-upper-level node; and based on the rotated tree structure, search an object node that is a node associated with a data set including an input data set, wherein the search of the object node includes: (a) if an object node has a reverse link, further search a node at a destination of the temporarily placed link associated with the reverse link, and (b) if a node other than an object node has a reverse link, further search a node at a destination of the reverse link.

2. The data management system according to claim 1, wherein the at least one processor is further configured to execute the computer program to:
select a link to be a target of the rotation operation from the original tree structure or the rotated tree structure,
if the selected link is a regular link that is not a reverse link, reverse levels of two nodes linked by the selected link, and transfer a transferred link that is a link immediately below an ex-lower-level node to immediately below an ex-upper-level node to transform a tree structure,
store, in the at least one memory, the selected link as the reverse link, and
store, in the at least one memory, as the temporarily placed link, the transferred link in association with the reverse link.

3. The data management system according to claim 2, wherein the at least one processor is further configured to execute the computer program to:
when detecting, from the rotated tree structure, a node having both a reverse link and a regular link that is not a reverse link, transfer a subtree structure under the reverse link from a tree-structure-holding area of the at least one memory to a divided-tree-structure-holding area of the at least one memory.

4. The data management system according to claim 1, wherein the at least one processor is further configured to, when detecting, from the rotated tree structure, a node having both a reverse link and a regular link that is not a reverse link, transfer a subtree structure under the reverse link from a tree-structure-holding area of the at least one memory to a divided-tree-structure-holding area of the at least one memory.

5. The data management system according to claim 1, wherein the at least one processor is further configured to execute the computer program to:
select a link to be a target of the rotation operation from the original tree structure or the rotated tree structure, and if the selected link is a regular link that is not a reverse link, reverse levels of two nodes linked by the selected link, and transfer a transferred link that is a link immediately below an ex-lower-level node to immediately below an ex-upper-level node to transform a tree structure,
store, in the at least one memory, the selected link as the reverse link, and
store, in the at least one memory, as the temporarily placed link, the transferred link in association with the reverse link.

6. The data management system according to claim 1, wherein the at least one processor is further configured to execute the computer program to:
when detecting, from the rotated tree structure, a node having both a reverse link and a regular link that is not a reverse link, transfer a subtree structure under the reverse link from a first memory area to a second memory area.

7. A data management system according to claim 1, wherein the original tree structure indicate that a data set associated with an upper-level node include an element of a data set associated with a lower-level node and wherein a data set associated with a lower-level node of the rotated tree structure include an element not included in a data set associated with a higher-level node.

8. The data management system according to claim 1, wherein the at least one processor is further configured to execute the computer program to:
store the reverse link separate from the transformed tree structure.

9. The data management system according to claim 1, wherein each of the data sets associated with the nodes is a set of image data.

10. A data management device comprising:
at least one processor configured to:
store, in at least one memory, a rotated tree structure with transformed link orientation between nodes of an original tree structure transformed by a rotation operation reversing a level between the nodes, the original tree structure indicating hierarchical inclusion relations among data sets associated with the nodes, wherein the hierarchical inclusion relations of the data sets is determined based on similarity among data elements, wherein a data set associated with a lower-level node of the original tree structure is a subset of a data set associated with an upper-level node, and the set associated with a lower-level node is made up of the data elements having stronger similarity than the data set associated with the upper-level node,
store, in the at least one memory, a reverse link, to retain the hierarchical inclusion relation indicated by the original tree structure, the reverse link being a link between an ex-lower-level node and an ex-upper-level node that have been reversed,
store, in the at least one memory, a temporarily placed link in association with the reverse link, the temporarily placed link being a link to a node that has been transferred from immediately below the ex-lower-level node to immediately below the ex-upper-level node; and
based on the rotated tree structure, search an object node that is a node associated with a data set including an input data set, wherein the search of the object node includes: (a) if an object node has a reverse link, further search a node at a destination of the temporarily placed link associated with the reverse link, and (b) if a node other than an object node has a reverse link, further search a node at a destination of the reverse link.

11. A data management method comprising:
storing a rotated tree structure with transformed link orientation between nodes of an original tree structure transformed by a rotation operation reversing a level between the nodes, the original tree structure indicating hierarchical inclusion relations among data sets associated with the nodes, wherein the hierarchical inclusion relations of the data sets is determined based on similarity among data elements, wherein a data set associated with a lower-level node of the original tree structure is a subset of a data set associated with an upper-level node, and the set associated with a lower-level node is made up of the data elements having stronger similarity than the data set associated with the upper-level node;

storing a reverse link, to retain the hierarchical inclusion relation indicated by the original tree structure, the reverse link being a link between an ex-lower-level node and an ex-upper-level node that have been reversed;
storing a temporarily placed link in association with the reverse link, the temporarily placed link being a link to a node that has been transferred from immediately below the ex-lower-level node to immediately below the ex-upper-level node; and
based on the rotated tree structure, searching an object node that is a node associated with a data set including an input data set, wherein the search of the object node includes: (a) if an object node has a reverse link, further search a node at a destination of the temporarily placed link associated with the reverse link; and (b) if a node other than an object node has a reverse link, further search a node at a destination of the reverse link.

12. The data management method according to claim 11, further comprising:
selecting a link to be a target of the rotation operation from the original tree structure or the rotated tree structure;
if the selected link is a regular link that is not a reverse link: reversing levels of two nodes linked by the selected link, and transferring a transferred link that is a link immediately below an ex-lower-level node to immediately below an ex-upper-level node to transform a tree structure;
storing the selected link as the reverse link; and
storing the transferred link in association with the reverse link as the temporarily placed link.

13. A non-transitory storage medium that stores computer program code, which, when executed by a computer, causes the computer to:
store, in the at least one memory, a rotated tree structure with transformed link orientation between nodes of an original tree structure transformed by a rotation operation reversing a level between the nodes, the original tree structure indicating hierarchical inclusion relations among data sets associated with the nodes, wherein the hierarchical inclusion relations of the data sets is determined based on similarity among data elements, wherein a data set associated with a lower-level node of the original tree structure is a subset of a data set associated with an upper-level node, and the set associated with a lower-level node is made up of the data elements having stronger similarity than the data set associated with the upper-level node;
store, in the at least one memory, a reverse link, to retain the hierarchical inclusion relation indicated by the original tree structure, the reverse link being a link between an ex-lower-level node and an ex-upper-level node that have been reversed;
store, in the at least one memory, a temporarily placed link in association with the reverse link, the temporarily placed link being a link to a node that has been transferred from immediately below the ex-lower-level node to immediately below the ex-upper-level node; and
based on the rotated tree structure, search an object node that is a node associated with a data set including an input data set, wherein the search of the object node includes: (a) if an object node has a reverse link, further search a node at a destination of the temporarily placed link associated with the reverse link; and (b) if a node other than an object node has a reverse link, further search a node at a destination of the reverse link.

14. The non-transitory storage medium according to claim 13, wherein the computer program code, which, when executed by the computer, further causes the computer to:
    select a link to be a target of the rotation operation from the original tree structure or the rotated tree structure; and
    if the selected link is a regular link that is not a reverse link: reverse levels of two nodes linked by the selected link, and transfer a transferred link that is a link immediately below an ex-lower-level node to immediately below an ex-upper-level node to transform a tree structure;
    store the selected link as the reverse link; and
    store the transferred link in association with the reverse link as the temporarily placed link.

* * * * *